(12) United States Patent
Strunk (10) Patent No.: US 12,091,061 B2
(45) Date of Patent: Sep. 17, 2024

(54) SELF-PROPELLED ELEVATED TRANSPORTATION SYSTEM

(71) Applicant: Jeffrey Loresch Strunk, Eustis, ME (US)

(72) Inventor: Jeffrey Loresch Strunk, Eustis, ME (US)

( * ) Notice: Subject to any disclaimer, the term of this patent is extended or adjusted under 35 U.S.C. 154(b) by 0 days.

(21) Appl. No.: 18/121,912

(22) PCT Filed: Apr. 21, 2022

(86) PCT No.: PCT/US2022/025723
§ 371 (c)(1),
(2) Date: Mar. 15, 2023

(87) PCT Pub. No.: WO2022/226165
PCT Pub. Date: Oct. 27, 2022

(65) Prior Publication Data
US 2024/0199092 A1 Jun. 20, 2024

Related U.S. Application Data

(60) Provisional application No. 63/178,314, filed on Apr. 22, 2021.

(51) Int. Cl.
*B61B 3/02* (2006.01)
*B61B 5/00* (2006.01)
*B61B 7/06* (2006.01)

(52) U.S. Cl.
CPC .......... *B61B 3/02* (2013.01); *B61B 5/00* (2013.01); *B61B 7/06* (2013.01)

(58) Field of Classification Search
CPC .......... B61B 3/02; B61B 13/00; B61B 15/00; B61B 7/06; B61B 7/00; B61B 5/00; B61B 5/02
See application file for complete search history.

(56) References Cited

U.S. PATENT DOCUMENTS

| 3,353,503 A | * | 11/1967 | Pettit | B61B 7/06 104/298 |
| 3,858,520 A | * | 1/1975 | Patin | B61B 3/00 104/115 |
| 4,354,434 A | * | 10/1982 | Dehne | B61B 3/02 191/38 |

(Continued)

FOREIGN PATENT DOCUMENTS

| CN | 1463876 A | * | 12/2003 | ............. B61B 13/00 |
| WO | WO-2016088147 A1 | * | 6/2016 | ............... B61B 7/00 |

(Continued)

*Primary Examiner* — Zachary L Kuhfuss
*Assistant Examiner* — Cheng Lin
(74) *Attorney, Agent, or Firm* — Intellectual Property Consulting, LLC; Mark N. Melasky; Stephen M. Kepper (57) ABSTRACT

In accordance with embodiments of the invention, an elevated transportation system is provided. The elevated transportation system includes a plurality of towers. A plurality of track segments is operable to connect to the plurality of towers. A lift car is operable to move along the plurality of track segments. Each tower of the plurality of towers is operable to receive and connect one or more track segments. The plurality of towers is operable to enable the lift car to move along the plurality track segments.

11 Claims, 7 Drawing Sheets

(56) References Cited

U.S. PATENT DOCUMENTS

| | | | | |
|---|---|---|---|---|
| 6,389,982 B1 * | 5/2002 | Evensen | ............... | B61B 13/00 |
| | | | | 104/124 |
| 7,124,692 B2 | 10/2006 | Guenther et al. | | |
| 2008/0121133 A1 | 5/2008 | Sousa Jaques | | |
| 2013/0125778 A1 * | 5/2013 | LaCabe | ............... | B61B 13/00 |
| | | | | 104/287 |
| 2014/0116282 A1 * | 5/2014 | Horihan | ............... | B61B 3/02 |
| | | | | 104/89 |
| 2019/0241202 A1 * | 8/2019 | Thomas | ............... | B61L 27/16 |
| 2020/0324654 A1 | 10/2020 | Baertsch | | |

FOREIGN PATENT DOCUMENTS

| | | |
|---|---|---|
| WO | WO2019084265 | 5/2019 |
| WO | WO-2020226995 A1 * | 11/2020 |
| WO | WO2021015630 | 1/2021 |

\* cited by examiner

SELF-PROPELLED ELEVATED TRANSPORTATION SYSTEM

CROSS-REFERENCE TO RELATED APPLICATIONS

This application claims priority to PCT Application No. PCT/US2022/25723, filed Apr. 21, 2022, which claims priority to U.S. Provisional Patent Application Ser. No. 63/178,314, filed Apr. 22, 2021, each of which are incorporated by reference as if fully disclosed herein.

BACKGROUND OF THE INVENTION

Field of the Invention

The present invention relates generally to self-propelled elevated lift transportation systems.

General Background

Traditional elevated lift systems, such as ski lifts and cable cars, are used to transport riders between locations, frequently uphill, downhill, or above an area not suitable for ground transportation, such as an area with heavy snowfall or a body of water. While these traditional lift systems are effective in transporting users, these systems lack flexibility. Typical lift systems require a centralized power source, such as a wheel, to turn cable wires. Cable cars will be passively carried by the moving wire from one point to another via a linear cable segment. In order to change directions for a new branch of a cable line, a second power source would be needed to move a second cable on the new branch. Further, the entire system must be powered and operational even if user demand is only for a single car. Accordingly, what is needed is a more versatile and efficient elevated lift system.

SUMMARY OF THE INVENTION

In accordance with embodiments of the invention, an elevated transportation system is provided. The elevated transportation system includes a plurality of towers. A plurality of track segments is operable to connect to the plurality of towers. A lift car is operable to move along the plurality of track segments. Each tower of the plurality of towers is operable to receive and connect one or more track segments. The plurality of towers is operable to enable the lift car to move along the plurality track segments.

In accordance with embodiments of the invention, a lift car operable to travel along a track segment is provided. The lift car includes a chassis having an upper portion opposite a lower portion. A drive mechanism is disposed on the upper portion of the chassis and is operable to move the lift car along the track segment. A control panel is operable to enable control the car. A power source is operable to power the drive mechanism. A sensor is operable to communicate with a remote device. The lower portion of the chassis is operable to carry a payload.

In accordance with embodiments of the invention, a method of elevated transportation is provided. The method includes a first step of providing a plurality of towers. The method includes a second step of connecting a plurality of track segments to the plurality of towers. The method includes a third step of providing a lift car. The method includes a fourth step of traveling, by operation of the lift car, from an origin to a destination along the plurality of track segments.

BRIEF DESCRIPTION OF THE DRAWINGS

The foregoing and other objects, features, and advantages of the invention are apparent from the following detailed description taken in conjunction with the accompanying drawings in which like parts are given like reference numerals and, wherein.

The images in the drawings are simplified for illustrative purposes and are not depicted to scale. Within the descriptions of the figures, similar elements are provided similar names and reference numerals as those of the previous figure(s). The specific numerals assigned to the elements are provided solely to aid in the description and are not meant to imply any limitations (structural or functional) on the invention.

The appended drawings illustrate exemplary configurations of the invention and, as such, should not be considered as limiting the scope of the invention that may admit to other equally effective configurations. It is contemplated that features of one configuration may be beneficially incorporated in other configurations without further recitation.

DETAILED DESCRIPTION

The embodiments of the disclosure will be best understood by reference to the drawings, wherein like parts are designated by like numerals throughout. It will be readily understood that the components, as generally described and illustrated in the Figures herein, could be arranged and designed in a wide variety of different configurations or be entirely separate. Thus, the following more detailed description of the embodiments of the system and method of the disclosure, as represented in the Figures is not intended to limit the scope of the disclosure, as claimed, but is merely representative of possible embodiments of the disclosure.

Figure 1:
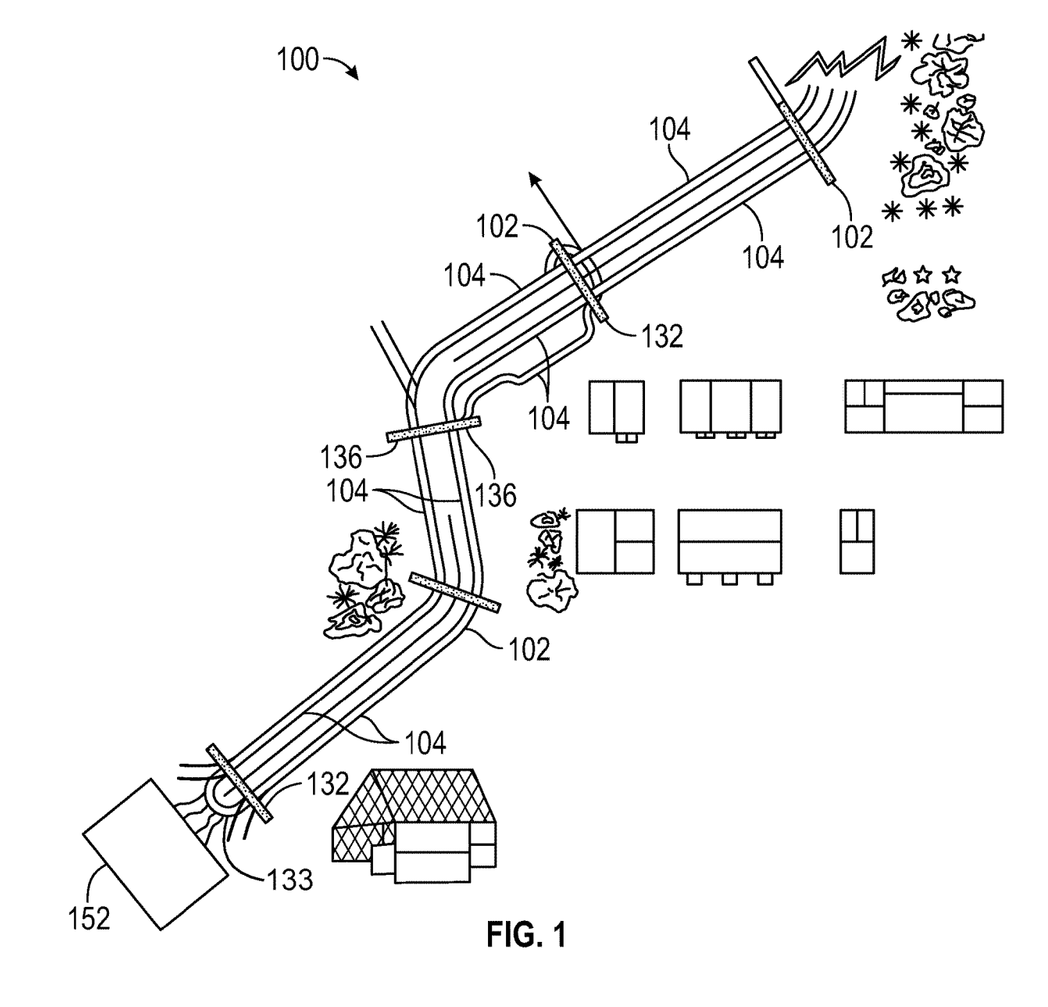
FIG. 1 illustrates a plan view of a self-propelled elevated transportation system in accordance with embodiments of the invention.
Figure 2:
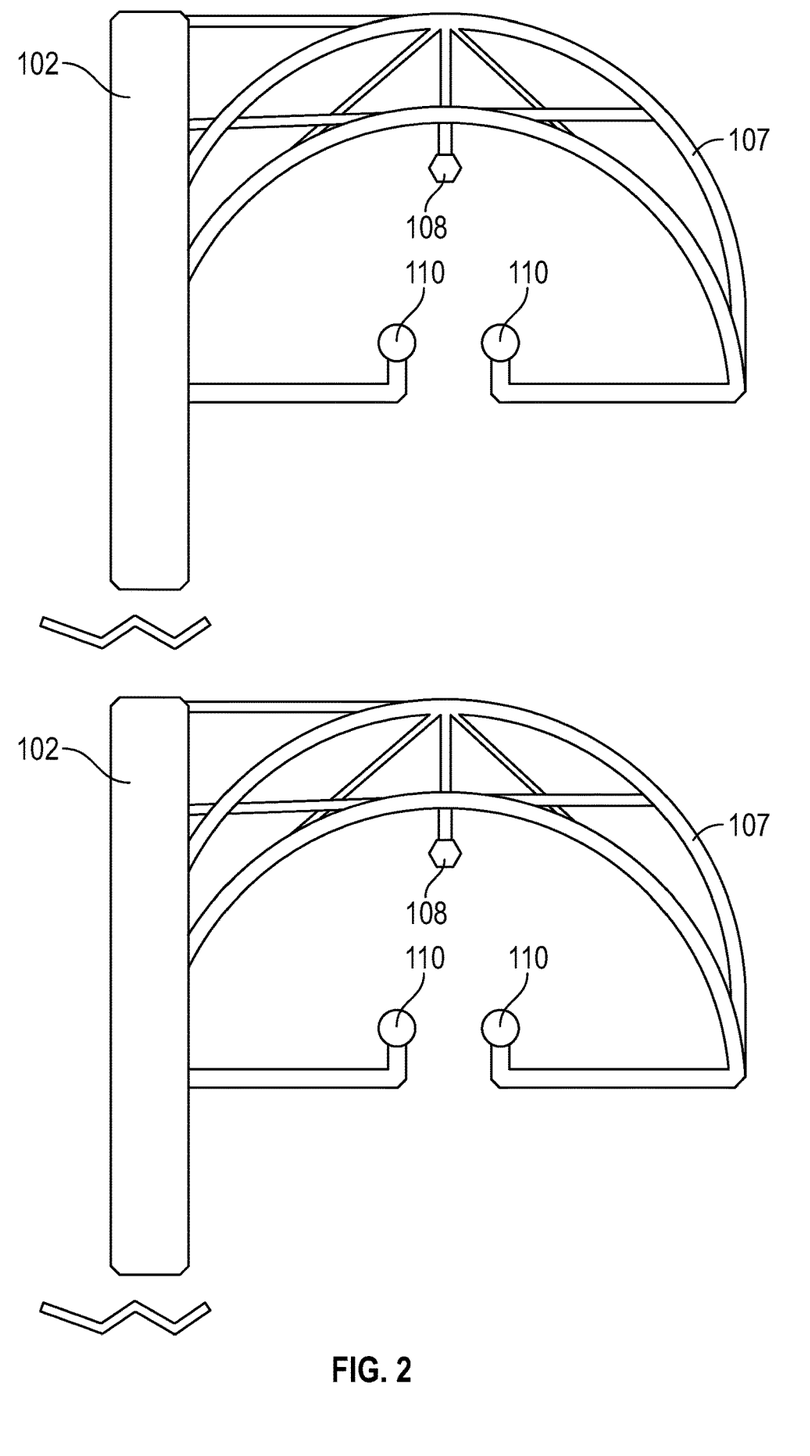
FIG. 2 illustrates a front view of a tower of a self-propelled elevated transportation system in accordance with embodiments of the invention.
Figure 3:
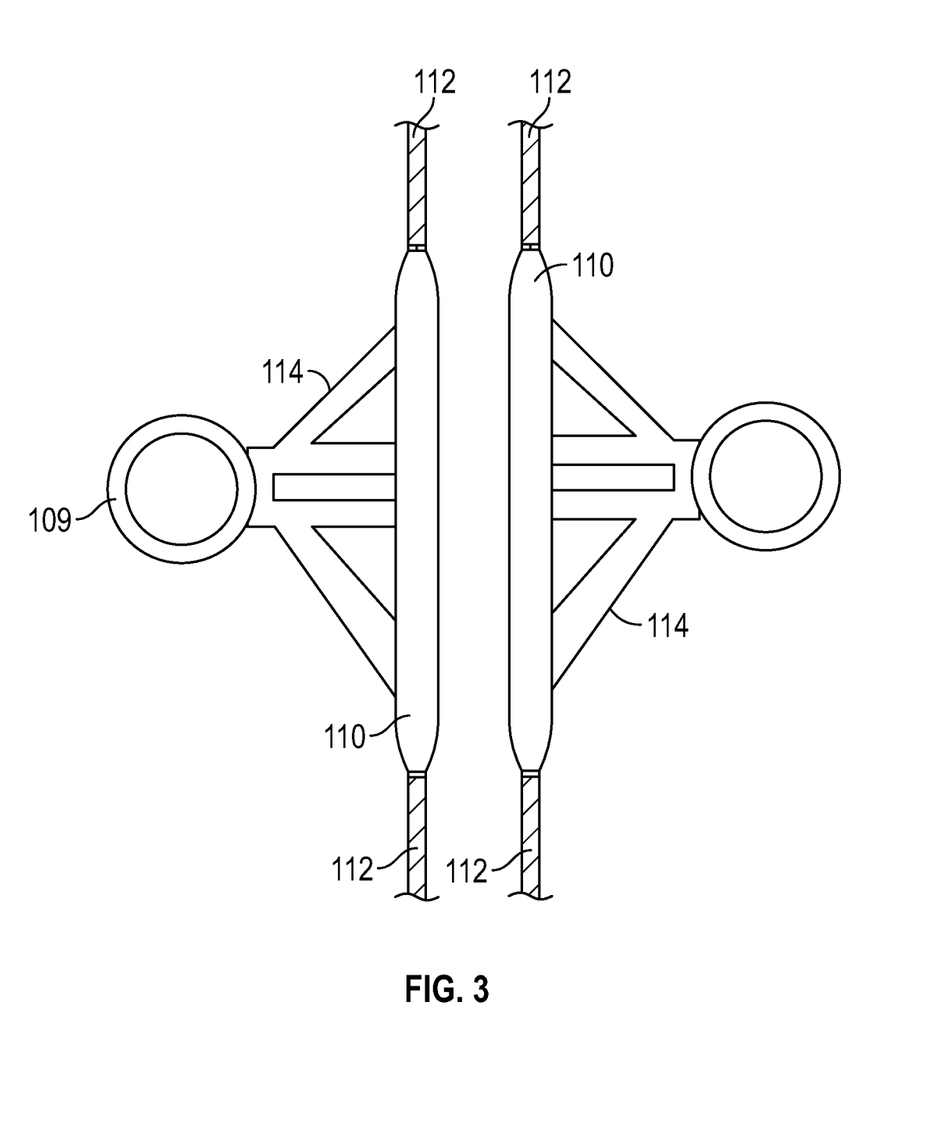
FIG. 3 illustrates a top view of a portion of a tower of a self-propelled elevated transportation system in accordance with embodiments of the invention.

In accordance with embodiments of the invention, a self-propelled elevated transportation system 100 is provided, as illustrated in FIGS. 1-11. FIG. 1 illustrates an exemplary track pattern of the self-propelled elevated transportation system 100. The self-propelled elevated transportation system 100 includes a plurality of towers 102. Each of the plurality of towers 102 is operable to receive and connect one or more track segments 104. The towers 102 are operable for a lift car 106 to move along the one or more track segments 104. The plurality of track segments 104 is operable to connect the plurality of towers 102. As illustrated in the Figures, the track segments 104 are a fixed pair of cables 112. In some embodiments, the track segments 104 are a single cable, a plurality of cables, or a fixed light rail, for example. The track segments 104 may include a heating core or heating element to melt snow and ice buildup on the track segments 104. As illustrated in FIG. 2, each tower 102 includes a cantilever arm 107. A tower sensor 108 is connected to the cantilever arm 107. The sensor 108 is operable to detect the presence, speed, and other metrics of a lift car 106 passing through the tower 102. Cable rail sleeves 110 are operable to receive and secure or encompass cables 112 to create a continuous track through the tower 102 to enable a lift car 106 to pass through the tower 102. As illustrated in FIG. 3, braces 114 are operable to provide stability to cables 110. A tower bracket 109 is operable to connect to the tower 102 or the cantilever arm 107, for example. In some embodiments, the braces 114 are operable to enable the cables 110 to curve laterally, ascend, or descend. An aerial return tower 133 is operable to enable a 180 degree turn. Embodiments of the invention are operable for use along ski slopes, enabling lift cars 106 to travel up and down slopes, travel to buildings, such as charging houses, lodges, condos, homes, or any other destination connected by the system 100. Embodiments of the towers 102 include a telescoping feature operable to elevate the cantilever arm 107, thereby increasing the ground clearance, which is useful after snow buildup. Each tower 102 of the system 100 is operable to simultaneously telescope to uniformly elevate the tracks segments 104. In some embodiments, the cantilever arm 107 and tower brackets 109 are operable to move as an assembly relative to a fixed tower 102 to elevate the track segments 104. The combined assembly may be elevated telescopically, hydraulically, by a motor, or by ratcheting, for example. Embodiments of the system 100 are further operable for zero gravity applications, such as bases on moons, planets, or space stations, enabling travel by cable rather than requiring pilots to dock jets.

Figure 4:
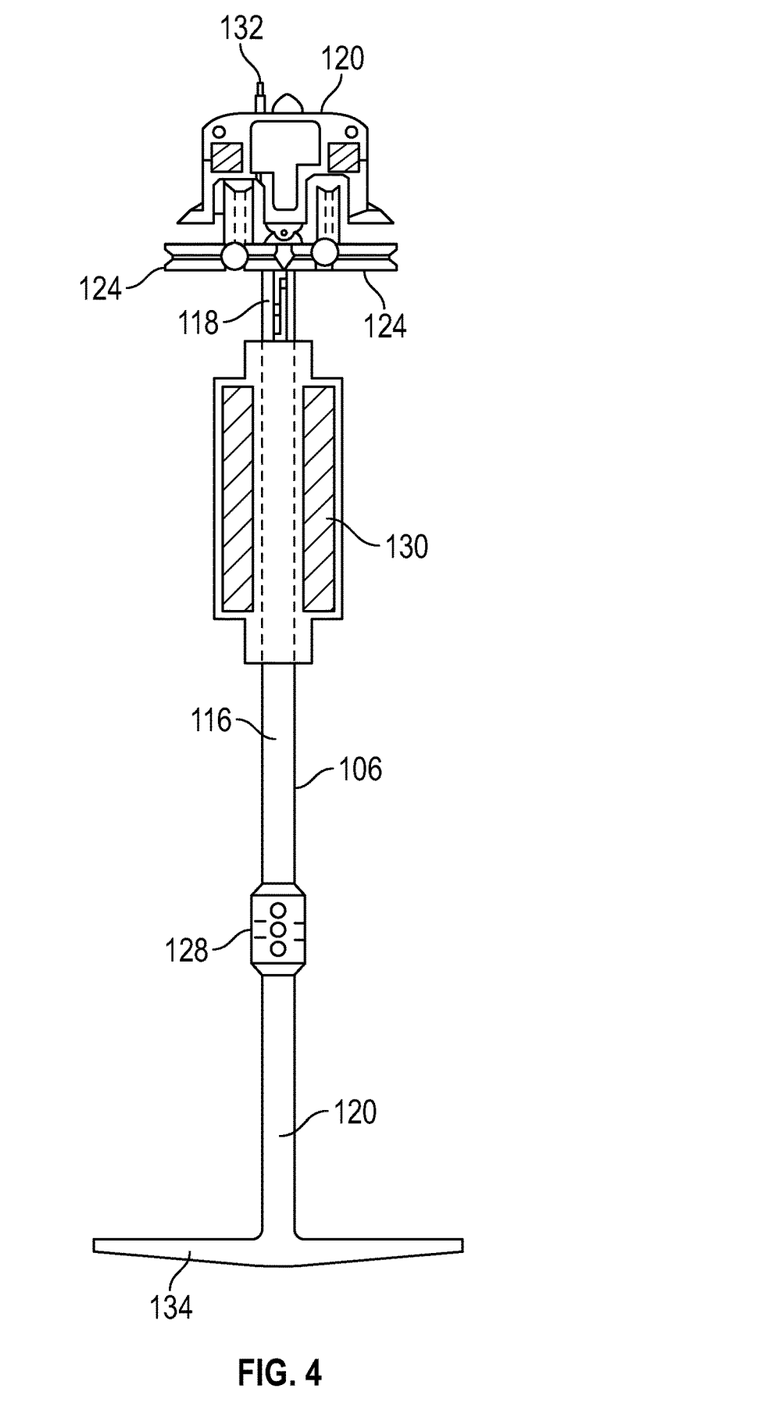
FIG. 4 illustrates a front view of a lift car of a self-propelled elevated transportation system in accordance with embodiments of the invention.
Figure 5:
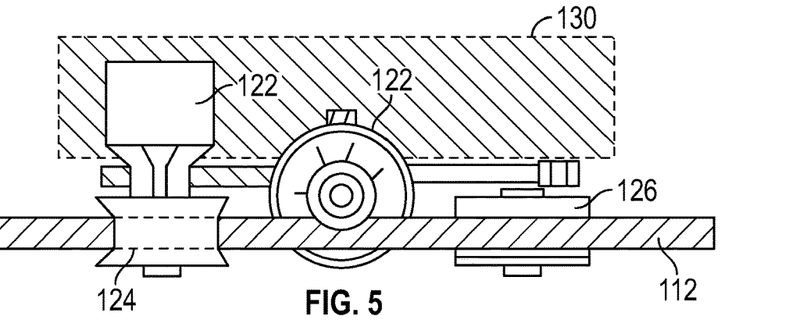
FIG. 5 illustrates a side view of a drive mechanism of a lift car of a self-propelled elevated transportation system in accordance with embodiments of the invention.
Figure 6:
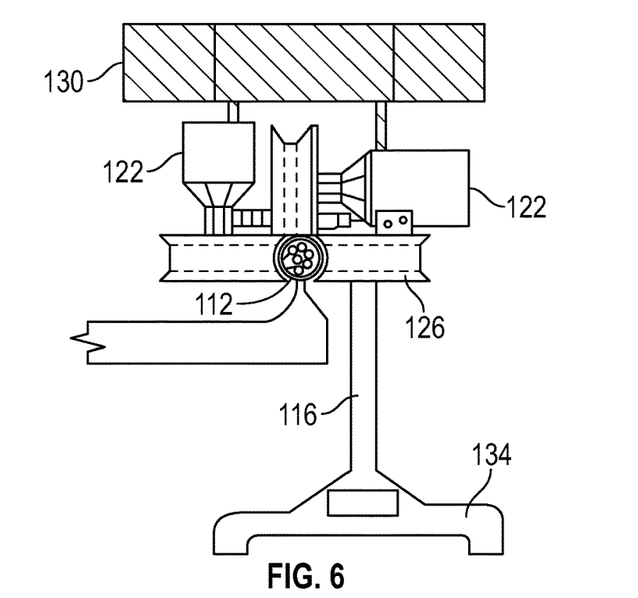
FIG. 6 illustrates a front view of a drive mechanism of a lift car of a self-propelled elevated transportation system in accordance with embodiments of the invention.
Figure 7:
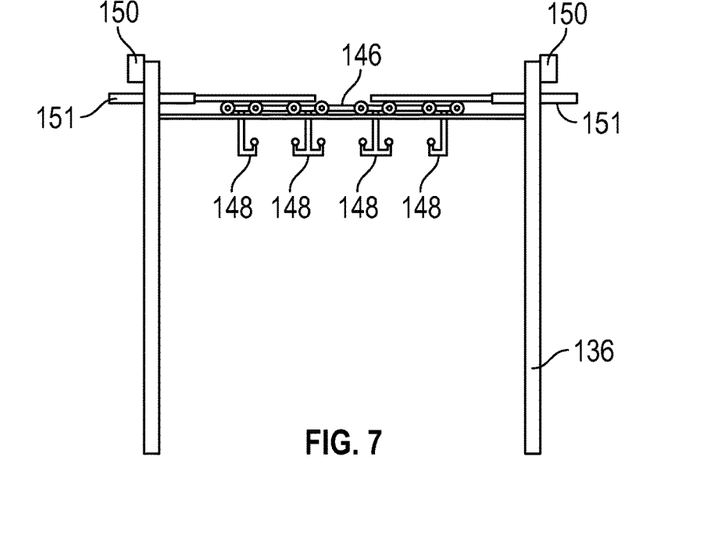
FIG. 7 illustrates a front view of a switch tower of a self-propelled elevated transportation system in accordance with embodiments of the invention.
Figure 8:
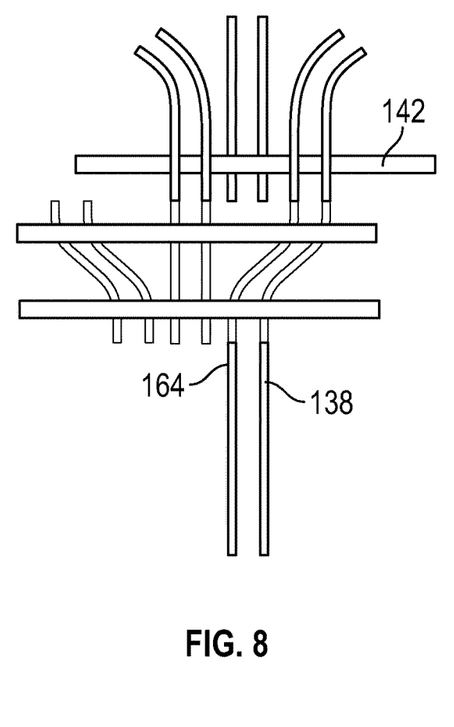
FIG. 8 illustrates a top view of a switch tower of a self-propelled elevated transportation system in accordance with embodiments of the invention.
Figure 9:
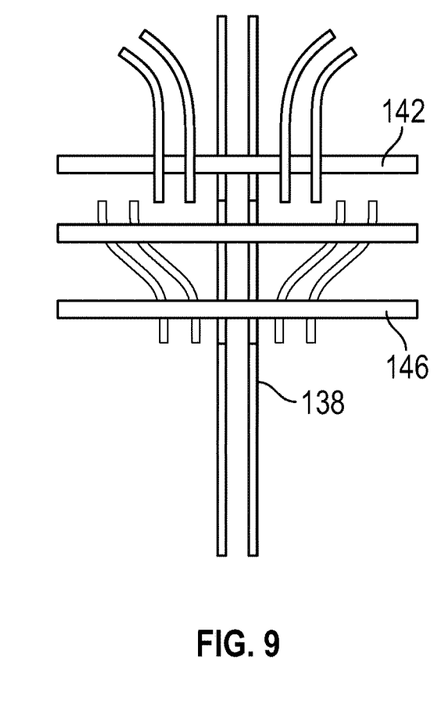
FIG. 9 illustrates a top view of a switch tower of a self-propelled elevated transportation system in accordance with embodiments of the invention.
Figure 10:
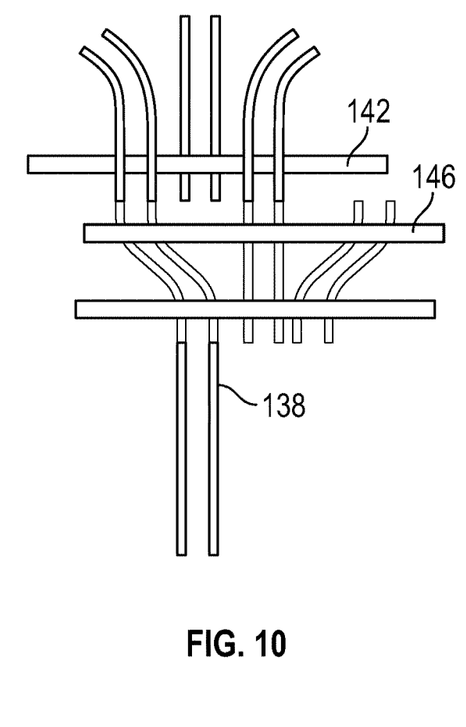
FIG. 10 illustrates a top view of a switch tower of a self-propelled elevated transportation system in accordance with embodiments of the invention.

As illustrated in FIGS. 4-6, one or more lift cars 106 are operable to move along the plurality of track segments 104. The lift car 106 includes a chassis 116 having an upper portion 118 opposite a lower portion 120. A drive mechanism 122 is disposed on the upper portion 118 of the chassis 116. The drive mechanism 122 is operable to move the lift car 106 along a lift track 104. In the embodiment illustrated in the Figures, the drive mechanism 122 is an electric drive system, for example a pair of electric motors, operable to drive a pair of drive pulleys 124 and a pair of stabilizer pulleys 126 to act as a pinch system. Some embodiments may use gas or diesel powered motors, for example. The pulleys 124 and 126 are operable to drive and stabilize the lift car 106 along the cables 112. A control panel 128 is operable to enable a rider to control the lift car 106. The control panel 128 may include switches, push buttons, or touch screen controls to start and stop, adjust a throttle, select the speed, enable remote control, dispatching, or select a destination in the system 100, for example. This provides an advantage over the prior art by enabling independent control of a single car moving throughout the elevated transportation system 100, as prior art cars are pulled by a cable controlled in a central location for the entire system, preventing cars from moving independently. A power source 130 is operable to power the drive mechanism 122. As illustrated in the Figures, power source 130 is a rechargeable battery, which may be fixed, removable, or charged by induction braking or solar power, for example. A solar panel may be included on the lift car 106 to power the lift car 106 or charge the rechargeable battery, for example. Alternate power sources may include wireless power, ion propulsion, or fuel cells. In embodiments incorporating petroleum powered motors, the power source 130 is a fuel tank. Embodiments utilizing electric battery powered motors are advantageous, as fossil fuel motors are typically heavier and fuel tanks must be refilled frequently. Fossil fuel motors emit carbon dioxide fumes, which is hazardous in an enclosed building, such as station, storage facility, or a warehouse. In some embodiments, the cables 112 will provide electricity and the lift car 106 will incorporate an electrical connection to connect to the power. A car sensor 132 is operable to connect to the tower sensor 128 to enable slowing, starting, returning, stopping, return to skier speed, or to send the car to a new destination, for example. The lower portion 120 of the lift car 106 is operable to carry a payload, such as a rider, equipment, or a package, for example. As illustrated, a t-bar 134 is disposed on the lower portion 120 of the chassis 116 and is operable for a user to be pulled by the lift car 106 or to sit on the lift car 106. In some embodiments, lower portion 120 contains a seat capable of accommodating one or more persons, an equipment basket, or any other attachment capable of facilitating the transport of people, equipment, or supplies. Embodiments of the lift car 106 may include a light, such as an LED light, to illuminate the pathway in front of the lift car 106, speakers to play music, WiFi hotspots, or connections to enable riders to charge cellular phones or other devices.

In some embodiments, the lift car 106 is controlled by a software application operable to communicate wirelessly with the control panel 128. The software application enables an operator to load and schedule destinations, to display metrics of the lift car 106, such as remaining battery life, temperature, and operational data required to detect maintenance issues. The software application allows the operator to control one or more lift cars 106, such as speed, reverse, forward, go to charging station, stop, slow, etc.

In accordance with embodiments of the invention, a switch tower 136 is provided, as illustrated in FIGS. 7-10. The switch tower 136 includes a single track port 138 disposed on a first side of the tower 136. The single track port 138 is operable to connect to a track segment 104 of the elevated transportation system 100. A multiple track port 142 is disposed on a second side of the tower 136. The multiple track port 142 has a plurality of track ports operable to connect to one or more track segments 104. A rail switch cage 146 is disposed on the switch tower 136 between the single track port 138 and the multiple track port 142. A plurality of switch track segments 148 is disposed within the rail switch cage 146. Each of the plurality of switch track segments 148 is operable to connect the single track port to a track port of the multiple track port 142. The switch tower 136 includes a rail switch cage drive mechanism 137, such as an electric hydraulic motor 150 and piston arm 151, for moving the rail switch cage 146 relative to the single track port 138 and the multiple track port 142 to selectively align one of the plurality of switch track segments 148 with the single track port 138 and a track port contained within the multiple track port 142. By moving the rail switch cage 146 relative to the ports 138 and 142, the switch tower 136 enables a car 106 to selectively switch from one track to three tracks, or from one of the three tracks to a single track, by moving the rail switch cage 146 to create a continuous track. Embodiments may have two, four, or another number of switch track segments 148 depending on the application. In an alternative embodiment, system 100 can employ any switching mechanism known in the art; for example, any switching mechanism used on fixed rail systems.

As illustrated in FIG. 1, embodiments of the system 100 enable lift transportation in directions other than a straight line, as the lift cars 106 are self-propelled rather than moved by a moved cable. This enables construction of the system 100 around specific objects, such as trees, mountains, hills, or buildings. Switch towers 136 enable the construction of spur lines to various destinations, stations, or an individual's home. A charging house 152 may house multiple cars 106 and charge the power sources 130 of each car while in the charging house 152. Embodiments of the system 100 reduce the environmental impact. The route of system 100 is operable to be constructed to avoid obstacles and to utilize a narrower right of way than a traditional lift mechanism, thereby reducing the amount of vegetation needing to be cleared.

Figure 11:
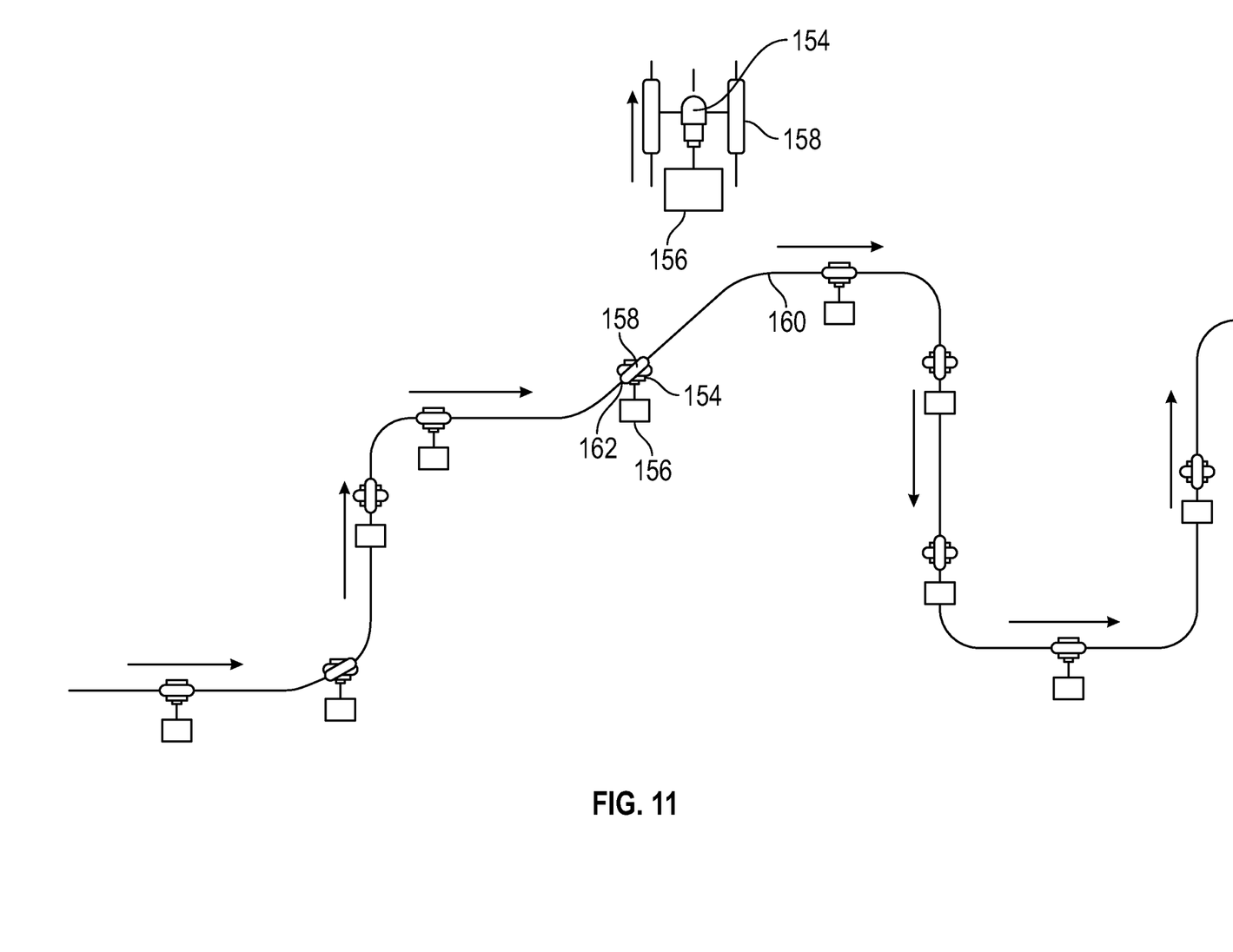
FIG. 11 illustrates a plan view of a self-propelled elevated transportation system operable for transporting a package in accordance with embodiments of the invention.

Referring to the embodiment illustrated in FIG. 11, the self-propelled elevated transportation system 100 is operable to transport packages in a warehouse. A package lift car 153 includes a rotating gear box 154, which is operable to act as a gimble, to enable a package carrier 156 to hang from the drivetrain 158 to travel along cables 160. A cowling 162 contains components of the drivetrain, such as wheels. A clearance, such as six inches, for example, enables clearance for a package to be carried without contacting the cables. The package carrier 156 may carry a utility cart, a platform, personnel, or a robot. In one embodiment, the robot will include artificial intelligence capabilities to autonomously fill orders by utilizing a camera to read UPC codes for destinations, as well as include functionality for picking up a package or a product, for example. The software application enables an operator to load and schedule destinations within a warehouse, automatically accept an order from the internet retailer, and automatically go to the destination within the warehouse containing the product to fill the order. Embodiments incorporating multiple lines of track segments 104 may be configured for the lines of track segments 104 to run side by side or configured to be stacked vertically, as illustrated in FIG. 2.

For the purposes of promoting an understanding of the principles of the invention, reference has been made to the preferred embodiments illustrated in the drawings, and specific language has been used to describe these embodiments. However, this specific language intends no limitation of the scope of the invention, and the invention should be construed to encompass all embodiments that would normally occur to one of ordinary skill in the art. The particular implementations shown and described herein are illustrative examples of the invention and are not intended to otherwise limit the scope of the invention in any way. For the sake of brevity, conventional aspects of the system (and components of the individual operating components of the system) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

What is claimed is:

1. A lift car operable to travel along a track segment, comprising:
    a chassis having an upper portion opposite a lower portion;
    an electric drive system disposed on the upper portion of said chassis, said electric drive system operable to move said lift car along said track segment, said electric drive system comprising:
        one or more electric motors;
        one or more drive pulleys;
        one or more stabilizer pulleys; and
        wherein said one or more electric motors are operable to drive said one or more drive pulleys and said one or more stabilizer pulleys are operable to pinch cables of a track segment;
    a control panel operable to enable control said car;
    a power source operable to power said drive mechanism;
    a sensor operable to communicate with a remote device; and
    wherein said lower portion of said chassis is operable to carry a payload.

2. The lift car of claim 1, wherein the power source is a rechargeable battery.

3. The lift car of claim 1, wherein the power source is a wireless charger.

4. The lift car of claim 1, further comprising a solar panel, said solar panel operable to charge the power source.

5. The lift car of claim 1, wherein the control panel is operable to enable a rider to control the car.

6. The lift car of claim 1, wherein the control panel is operable to enable remote control of the car.

7. The lift car of claim 1, wherein the payload is a rider.

8. The lift car of claim 1, further comprising a lift car sensor operable to enable said lift car to slow, start, return, stop, return to skier speed, or to send said lift car to a destination.

9. A method of elevated transportation, comprising:
    providing a plurality of towers;
    connecting a plurality of track segments to said plurality of towers;
    providing a lift car;
    traveling, by operation of said lift car, from an origin to a destination along said plurality of track segments; and
    wherein said lift car is powered by an electric drive mechanism, said electric drive mechanism comprising:
        one or more electric motors;
        one or more drive pulleys;
        one or more stabilizer pulleys; and
        wherein said one or more electric motors are operable to drive said one or more drive pulleys and said one or more stabilizer pulleys are operable to pinch cables of a track segment.

10. The method of claim 9, wherein said lift car is remote controlled.

11. The method of claim 9, wherein said lift car is controlled by an onboard control panel.

\* \* \* \* \*